(12) United States Patent
Stoichita et al.

(10) Patent No.: US 9,467,051 B2
(45) Date of Patent: Oct. 11, 2016

(54) SWITCHING REGULATOR USING ADAPTIVE SLOPE COMPENSATION WITH DC CORRECTION

(71) Applicant: Micrel, Inc., San Jose, CA (US)

(72) Inventors: Ioan Stoichita, Campbell, CA (US); Paolo Nora, Belgioioso (IT); Charles Vinn, Milpitas, CA (US); Bruce Larson, Austin, TX (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 14/557,133

(22) Filed: Dec. 1, 2014

(65) Prior Publication Data

US 2015/0200593 A1    Jul. 16, 2015

Related U.S. Application Data (60) Provisional application No. 61/928,299, filed on Jan. 16, 2014.

(51) Int. Cl.
*H02M 3/158* (2006.01)
*H02M 3/156* (2006.01)
*H02M 3/155* (2006.01)

(52) U.S. Cl.
CPC ............. *H02M 3/158* (2013.01); *H02M 3/155* (2013.01); *H02M 3/156* (2013.01)

(58) Field of Classification Search
CPC .................................................... H02M 3/158
USPC ........................................ 323/282, 283, 284
See application file for complete search history.

(56) References Cited

U.S. PATENT DOCUMENTS

| 4,837,495 | A | 6/1989 | Zansky |
| 4,975,820 | A | 12/1990 | Szepesi |
| 6,369,665 | B1 | 4/2002 | Chee et al. |
| 6,498,466 | B1 | 12/2002 | Edwards |
| 6,611,131 | B2 | 8/2003 | Edwards |
| 7,378,822 | B2 | 5/2008 | Liao |
| 2009/0309557 | A1* | 12/2009 | Miyamae ............... H02M 3/156 323/234 |
| 2010/0301827 | A1* | 12/2010 | Chen ...................... H02M 3/156 323/299 |
| 2014/0211526 | A1* | 7/2014 | Pidutti ................. H02M 1/4225 363/84 |

OTHER PUBLICATIONS

Raymond B. Ridley, A New, Continuous-Time Model for Current-Mode Control, IEEE Transactions on Power Electronics, vol. 6, No. 2, pp. 271-280Apr. 1991.
Robert Sheehan, Power Electronics, A New Way to Model Current-Mode Control, May 5, 2007.
Robert Sheehan, Power Electronics, Part Two, A New Way to Model Current-Mode Control, Jun. 2007.

* cited by examiner

*Primary Examiner* — Matthew Nguyen
*Assistant Examiner* — Trinh Dang
(74) *Attorney, Agent, or Firm* — Van Pelt, Yi & James LLP (57) ABSTRACT

A switching regulator using current mode control and adaptive slope compensation includes a DC correction circuit to introduce a DC correction signal to cancel the DC offset error generated by the slope compensation signal. In some embodiments, the DC correction signal is a function of the input voltage and the output voltage and is applied in response to the slope compensation signal being applied. In one embodiment, the DC correction signal is a linear function of the input voltage and the output voltage.

18 Claims, 7 Drawing Sheets

FIG. 1

FIG. 2  STEP-DOWN VALLEY CURRENT MODE CONTROL SIGNALS

FIG. 3

DC Offset canceling error expressed as percentage of Ipp

FIG. 4

DC Offset canceling error expressed as percentage of Ipp

DC Offset canceling errors as a function of Vin for the Peak Current Mode Buck Converter

SWITCHING REGULATOR USING ADAPTIVE SLOPE COMPENSATION WITH DC CORRECTION

CROSS REFERENCE TO OTHER APPLICATIONS

This application claims priority to U.S. Provisional Patent Application No. 61/928,299 entitled SWITCHING REGULATOR USING ADAPTIVE SLOPE COMPENSATION WITH DC CORRECTION, filed Jan. 16, 2014, which application is incorporated herein by reference for all purposes.

BACKGROUND OF THE INVENTION

Switching regulators, also referred to as DC to DC converters, are used to generate a constant voltage level on a load using an inductor as a mean of storage of energy and transfer to the load. In operation, switching regulators are often used to convert an input supply voltage to an output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output in packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional buck switching regulator is well known and is generalized as follows. A conventional buck switching regulator includes a pair of power switches which are turned on and off to regulate an output voltage to be equal to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

More specifically, the pair of power switches is often referred to as including a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous rectification operation.

A wide variety of control methods can be applied to switching regulators. One type of switching regulator control scheme is current mode control where the switching regulator modulates the peak current or the valley current in the output inductor in order to deliver the required energy to the load to maintain the desired output voltage. In current mode control, the inductor or power switch current is sensed and the sensed current is compared to a current loop error signal to control the turning on or off of the high-side power switch.

In current mode control switching regulators, the current control loop using peak current mode or valley current mode needs a slope compensation signal added to the sensed current in order to achieve stable operation. The stabilizing effect of the slope compensation signal manifests itself through the slew rate of the slope compensation signal compared with inductor current slew rate, and not through the DC component added. The slope compensation signal can be added using AC coupling (see U.S. Pat. No. 4,837,495) or using DC coupling.

Slope compensation circuit can be provided on-chip, i.e. on the same integrated circuit as the switching regulator, or off-chip, i.e., as discrete components outside of the switching regulator integrated circuit. With the use of on-chip slope compensation, DC coupling of the slope compensation signal is preferred. Furthermore, adaptive slope compensation related to Vin and Vout is preferred as external adjustments are not possible for the on-chip slope compensation circuit.

In most cases, the slope compensation signal needs to be added to at least some of the duty cycle values, if not the entire range of the duty cycle. For example, the slope compensation signal may be added at least for duty cycle (D):

$$D > 50\% \text{ for peak current mode} \quad (1)$$

or $$D < 50\% \text{ for valley current mode} \quad (2)$$

In the present description, duty cycle D refers to the percentage of time the power switch is turned on relative to the total period of the switching cycle to deliver discrete energy packets or discrete current pulses to the low loss component, such as the inductor, of the switching regulator.

In actual practice, for noise reasons and stability, the slope compensation signal is usually added for $D>30\text{-}40\%$ for peak current mode and $D<60\text{-}70\%$ for valley current mode. Also for reasons of adaptability, in a valley current mode control switching regulator, a "proportional slope" compensation adaptive to Vin-Vout is preferred over "fixed slope" compensation.

Adaptive slope compensation using nonlinear relationship between the duty cycle and the slope compensation signal for peak current mode is described in U.S. Pat. Nos. 7,378,822, 6,498,466, 6,611,131, and 6,369,665. Adaptive slope compensation based on sensing Vin, Vout and sizing the slope using linear approximations for the peak current mode control is described in U.S. Pat. No. 4,975,820.

However, the benefits of adding DC slope compensation are accompanied by some problems. In particular, the slope compensation signal added using DC coupling to the sensed current in the inductor generates a DC voltage difference between the programmed current and the sensed current. The DC voltage difference is reflected back on the error amplifier output as an offset voltage. The offset voltage is a function of the input voltage Vin or the output voltage Vout and limits the DC performance of the switching regulators in other ways.

Solutions to the offset problem introduced by using DC slope compensation have been proposed in U.S. Pat. Nos. 6,611,131 and 6,498,466. The solution described in these patents for correcting the DC Offset introduced by the slope compensation signal is to generate a "second slope compensation signal" and adjust the current limit point of the regulator as a function of the second slope compensation signal so as to maintain the current limit to be substantially constant. The "second slope compensation signal" is proportional to the slope compensation signal. Note that this solution adds a transient signal—the second slope compensation signal—to correct the DC offset even in a steady state situation when the input voltage Vin and the output voltage Vout are constant. Other solutions are proposed in U.S. Pat. No. 7,378,822.

For example, U.S. Pat. No. 7,378,822 describes that it is better "to start slope compensation preferably only slightly ahead of PWM switch-OFF" in peak current mode. This example keeps the benefits of the correct slew rate of slope in the moment of decision and reduces dramatically the DC offset introduced by the slope compensation, which is not always present for duty cycle greater than 50%, but only for a much smaller amount of time around the decision point during the period T.

For step down peak current mode control converter, the DC offset introduced by the slope compensation increases with the duty cycle D, and is at the maximum as the converter approaches the dropout point. The step-down peak current mode suffers the disadvantage of the DC offset generated by slope compensation as Vin is lower and closer to dropout, however the DC offset in peak current mode converter is not varying with Vout which is regulated.

For step down valley current mode converter, the DC offset introduced by the slope compensation increases with 1-D, and is at a maximum as the converter approaches the minimum duty cycle. For step down valley current mode converter, in addition to the disadvantage of a large DC offset, the offset is also dependent of (Vin-Vout) which limits the line rejection and limits even the upper range of voltage Vin in the case when the input voltage Vin has a large voltage range.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a circuit and method to correct for the DC offset error generated by the slope compensation signal in a current mode control switching regulator introduces a DC correction current to the summing node of the current control loop. In particular, the circuit and method is effective in correcting, reducing or eliminating the DC offset generated by the slope compensation signals at the extremes of the duty cycle (D), such as for D>>0.5 for peak current mode and D<<0.5 for valley current mode.

In the present description, duty cycle D refers to the percentage of time the power switch is turned on relative to the total period of the switching cycle to deliver current pulses to the output inductor of the switching regulator. It is understood that the duty cycle of a switching regulator is a function of the input voltage Vin supplied to the switching regulator and the output voltage to be generated by the switching regulator.

In embodiments of the present invention, a current mode control switching regulator refers to a switching regulator using a current mode feedback control scheme to control the power switches such that the power switches and the inductor together act as a voltage-controlled current source. The current mode feedback control scheme controls the voltage-controlled current source to maintain a constant voltage at the output of the switching regulator over variations in the load current demand.

In particular, the current mode feedback control scheme senses the inductor current information and uses the inductor current information to influence the decision to turn-on and/or turn-off the power switches. Current mode feedback control is implemented using two control loops. A current control loop monitors the inductor current information and controls the voltage-controlled current source formed by the power switches coupled to the inductor. The current control loop sets a current reference which can be the valley or peak of the inductor current. Meanwhile, a voltage control loop monitors the switching regulator output voltage and programs the voltage-controlled current source to regulate the output voltage to a desired voltage value.

In embodiments of the present invention, the current mode control switching regulator implements valley current mode control or peak current mode control. In valley current mode control, the current control loop senses the valley inductor current when the high-side power switch is turned off and then using the sensed current information to turn on the high-side power switch. Accordingly, a valley current mode feedback control circuit controls the turn-on event of the high-side power switch.

On the other hand, in peak current mode control, the current control loop senses the peak inductor current when the high-side power switch is turned on and then using the sensed current information to turn off the high-side power switch. Accordingly, a peak current mode feedback control circuit controls the turn-off event of the high-side power switch.

Figure 1:
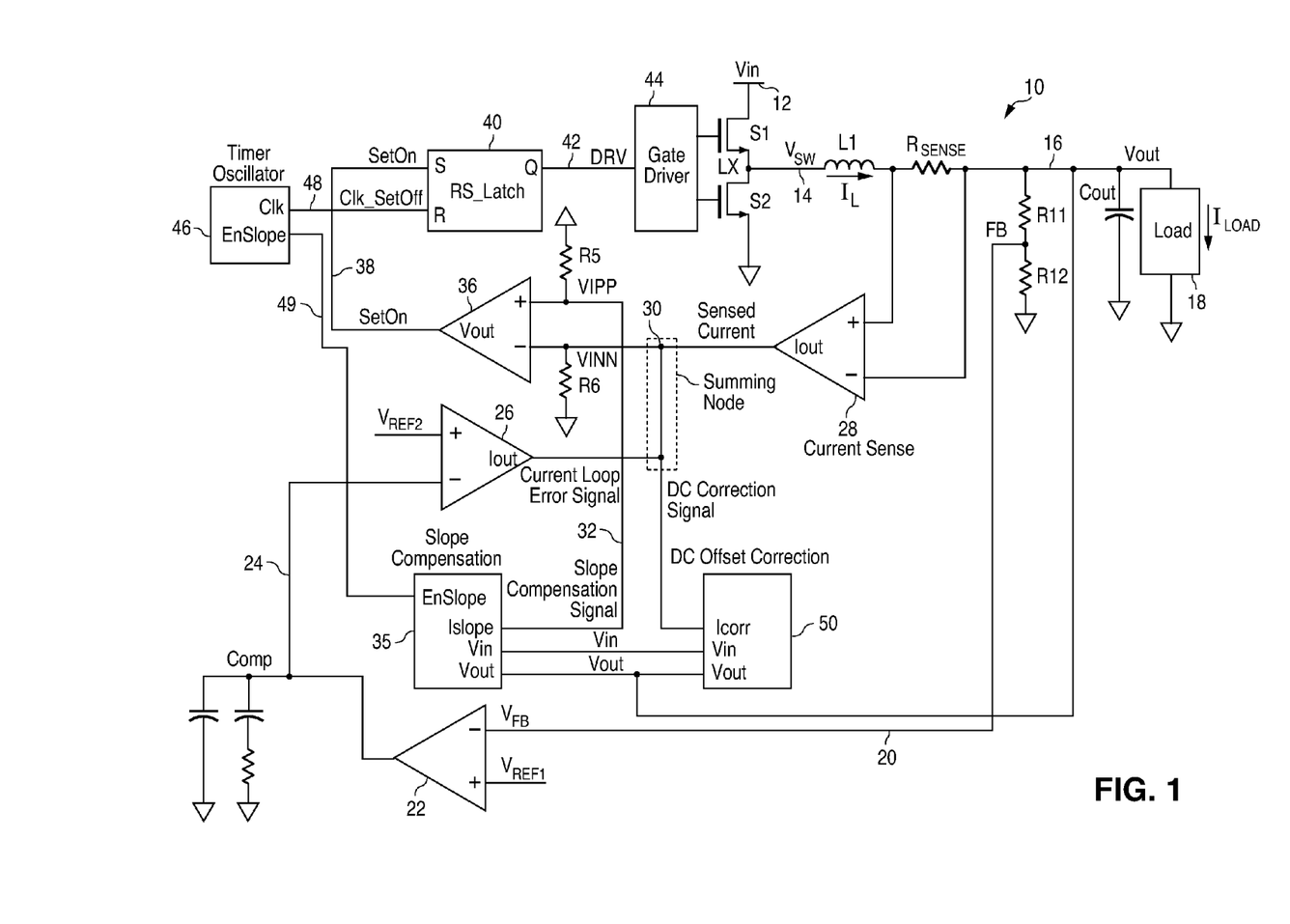
FIG. 1 illustrates a step-down valley current mode converter with slope compensation and DC offset correction according to one embodiment of the present invention.

FIG. 1 illustrates a step-down valley current mode switching regulator with slope compensation and DC offset correction according to one embodiment of the present invention. Referring to FIG. 1, the step-down (buck) valley current mode switching regulator (or DC-DC converter) 10 includes a pair of power switches S1 and S2 connected in series between an input voltage Vin (node 12) and a ground potential. Power switches S1 and S2 are alternately turned on and off to generate a switching output voltage $V_{SW}$ at a switch node (LX) 14. The switching output voltage $V_{SW}$ is directly coupled to an LC filter circuit including an output inductor L1 and an output capacitor $C_{OUT}$ to generate a regulated output voltage Vout at a node 16 having a substantially constant magnitude. The output voltage Vout can then be used to drive a load 18 whereby switching regulator 10 provides a load current $I_{LOAD}$ to maintain the output voltage Vout at a constant level. In the present illustration, power switches S1 and S2 are NMOS transistors. In other embodiments, power switch S1 can be implemented using PMOS transistor with the appropriate change in the polarity of the gate drive signal. The exact implementation of the power switches S1 and S2 is not critical to the practice of the present invention. Furthermore, in some embodiments, the output capacitor $C_{OUT}$ may be coupled to a resistor connected in series or the output capacitor $C_{OUT}$ may have an equivalent series resistance which can be represented as a resistor connected in series with the capacitor.

Switching regulator 10 includes a current mode feedback control circuit to regulate the energy transfer to the LC filter circuit to maintain the constant output voltage within the desired load limits of the circuit. In embodiments of the present invention, the switching regulator 10 implements current mode control and, more specifically, valley current mode control. Under the valley current mode control, the feedback control circuit of switching regulator 10 includes a current control loop to assess the inductor current relative to a reference current value being the valley inductor current and to control the turning on or off of the power switches so as to deliver the required energy to the load. In particular, the current control loop senses the inductor current and the sensed current is compared to a current loop error signal to control the turning on of the high-side power switch S1.

Meanwhile, the feedback control circuit further includes a voltage control loop to assess the switching regulator output voltage to control the turning on or off of the power switches so as to regulate the output voltage to the desired voltage value.

In embodiments of the present invention, the voltage control loop of the current mode feedback control circuit includes a feedback network, such as a voltage divider including resistors R11 and R12, to divide down the output voltage Vout to generate a feedback voltage $V_{FB}$ on a feedback node (FB) 20. The feedback voltage $V_{FB}$ is provided to an error amplifier 22 to be compared with the reference voltage $V_{REF1}$. The error amplifier output signal Comp (node 24) is indicative of the difference between the feedback voltage $V_{FB}$ and the reference voltage $V_{REF1}$. The Comp output signal is used to control the power switches S1 and S2 to turn on and off to regulate the output voltage Vout to be equal to a reference voltage $V_{REF1}$ or to a voltage value related to the reference voltage $V_{REF1}$.

In embodiments of the present invention, the current control loop of the current mode feedback control circuit includes a current loop operational transconductance amplifier (OTA) 26 configured to receive the error amplifier output signal Comp and a current control reference voltage $V_{REF2}$. The error amplifier output signal Comp is assessed relative to the current control reference voltage $V_{REF2}$ to generate an output current signal being the current loop error signal. The current loop error signal is indicative of the inductor current value requested by the voltage control loop, being the inductor current value needed to maintain the output voltage Vout at the desired voltage level.

The current control loop of the current mode feedback control circuit further includes a resistor Rsense coupled in series with the output node of the inductor L1 and the output voltage node 16 to act as the current sense resistor for sensing the inductor current. In other embodiments, other methods for current sensing can be used and the use of resistor Rsense is illustrative only and not intended to be limiting. For example, current sensing can be realized using the DCR (DC resistance) of the inductor L1. Current sensing can also be realized using a sense resistance in series with the source terminal of the low-side power switch S2, with the appropriate conditioning of the sensed current signal (for example, blanking) In the present embodiment, a current sense operational transconductance amplifier (OTA) 28 is used to sense the voltage across the resistor Rsense which is indicative of the current flowing through the inductor L1 and to generate a current output signal being the sensed current. The sensed current is summed with the current loop error signal at a current summing node 30. In the present description, currents being "summed" or combined at the current summing node can refer to the currents being added or subtracted. The use of the term "summing" is illustrative of the currents being combined but not necessarily related to the polarity of the current values.

In the present embodiment, a slope compensation signal (node 32) is added to the current control loop to enhance the stability of the current mode feedback control. In the present embodiment, the slope compensation signal is a current signal Islope generated by a slope compensation circuit 35 and is introduced to the current control loop through DC coupling. In some embodiments, the slope compensation signal is provided only for certain duty cycle values of the switching regulator. Furthermore, in some embodiments, when slope compensation is applied, the slope compensation signal may be provided only for a portion of the switching period, as controlled by the enable slope signal EnSlope (node 49) generated by a timer oscillator 46. Alternately, the slope compensation signal may be provided for the entire switching period. In the present embodiment, the slope compensation signal is generated as a function of at least the input voltage Vin and the output voltage Vout. Methods for generating the slope compensation signal is known in the art and will not be further described.

The current control loop, in response to the sensed current and the current loop error signal, generates a control signal SetOn (node 38). The control signal SetOn is asserted to turn on the high-side power switch S1 in response to the detection of the inductor current reaching a certain valley current limit in the valley current control mode. In the present example, the control signal SetOn is coupled to the Set input terminal of a Reset-Set Latch (RS_Latch) 40. When the SetOn control signal is asserted, the latch 40 asserts the Q output terminal (node 42) which provides the drive signal DRV to the power switches. The drive signal DRV is provided to a gate driver circuit 44 to generate the gate drive signals to drive the gate terminals of the power switches S1 and S2.

In some embodiment, in response to the drive signal DRV being asserted, the gate driver circuit 44 generates a gate drive signal to turn on the high-side power switch S1. Meanwhile, the gate driver circuit 44 generates a gate drive signal to turn off the low-side power switch S2. In this manner, the valley current control loop controls the turning on of the high-side power switch S1 which in turns causes the switching voltage $V_{SW}$ to increase to the input voltage Vin and in turns causes the inductor current $I_L$ to increase. In the present embodiment, the high-side power switch S1 is turned on for a given duration and then the high-side power switch S1 is turned off and the low-side power switch S2 is turned on until the valley current control loop detects that the inductor current has dropped to the given valley current limit and initiates another cycle to increase the inductor current. In particular, the SetON signal is asserted to turn on the high-side power switch and charge up the current at the inductor L1. In the present embodiment, the timer oscillator 46 generates a clock signal Clk_SetOff (node 48) which is coupled to the Reset input terminal of the RS_Latch 40. When the Clk_SetOff signal is asserted, the latch 40 resets or deasserts the drive signal DRV (node 42) and the high-side power switch S1 is turned off while the low-side power switch S2 is turned on. The inductor current decreases until the valley current limit is reached.

The timer oscillator 46 also generates an enable slope signal EnSlope (node 49) which is provided to the slope compensation circuit 35 to trigger the generation of the slope compensation signal (node 32) at the specific point of the switching period determined by the timer oscillator, such that slope compensation is added for all equal or smaller duty cycle values starting from that specific point. In particular, although not necessary, slope compensation can be added for all possible duty cycle values.

As described above, while the use of a slope compensation signal improves the stability of operation, introducing the slope compensation signal through DC coupling results in a DC offset error at the output voltage Vout. In embodiments of the present invention, a DC offset correction circuit 50 is incorporated in the switching regulator 10 to eliminate the DC offset introduced by the slope compensation signal. The DC offset correction circuit 50 generates a DC correction current which is provided to the summing node 30 to be summed with the sensed current and the current loop error signal. The construction of the DC offset correction circuit will be described in more detail below.

In the current control loop of the switching regulator 10, the current mode feedback control loop includes a comparator 36 configured to generate the control signal SetOn based at least on the sensed current and the current loop error signal. The SetOn control signal (node 38) is asserted to indicate that the high-side power switch S1 should be turned on. At comparator 36, the summing node 30 is coupled to the negative input terminal of the comparator while the slope compensation current signal is coupled to the positive input terminal of the comparator. In the present embodiment, comparator 36 is a voltage comparator and the summed current as well as the slope compensation current signal are converted to voltage signals by respective resistors R6 and R5 at the input terminals of the comparator.

More specifically, at the summing node 30, the current loop error signal, generated by the current loop OTA 26, is subtracted from the sensed current, generated by the current sense OTA 28, and the current difference is converted to a voltage VINN by resistor R6. The voltage signal VINN is applied to the negative input terminal of the comparator 36. Meanwhile, the slope compensation current signal (node 32) is generated by the slope compensation circuit 35 and is converted to a voltage VIPP by resistor R5. The voltage signal VIPP is coupled to the positive input terminal of the comparator 36. The comparator 36 generates the control signal SetOn to turn on the high-side power switch S1 in response to the detection of the inductor current reaching a certain valley current limit. In the present embodiment, OTA 26 is used to implement signal processing in the form of current signals and is not intended to limit the scope of the present invention. Signal processing could be performed using voltage signals only or using a mixture of voltage and current signals. In that case, OTA 26 may be omitted or may be replaced using other operational amplifier circuits.

In some embodiments, at the input of the comparator 36, the common mode can be designed to be always greater than ground level by having a differential current output for the current loop OTA 26, the current sense OTA 28, the slope compensation circuit 35, and the DC offset correction circuit 50. The common mode currents multiplied with resistors R5 and R6 move the common mode of the comparator well in the positive range.

The current sense gain, which has the unit of resistance, is defined as:

$$Ri = Gm(\text{Current\_Sense\_OTA}) * R6 * Rsense \quad (3)$$

The optimum slope compensation voltage signal Vslope scaled at the summing node to match the inductor current slew rate seen through the current sense gain Ri is:

$$\frac{dVslope}{dt} = (Vin - Vout) * \left(\frac{Ri}{L}\right) \quad (4)$$

The Vslope signal is brought in the summing node 30 as the slope compensation current signal Islope through dIslope/dt on resistor R5.

Equation (4) yields an optimum value of Vslope, based on knowledge of the inductor value of the output inductor L1. Small variations of the amount of Vslope around the optimum value are also possible, yielding slightly over damped or under damped but stable and acceptable current control loops. The same situation also applies if the internally generated slope compensation signal is based on an inductor value which is slightly different form the actual one, e.g. due to inductor tolerance or other effects. Therefore, without loss of generality, it is possible to extend the same equation to any amount of slope compensation proportional to (Vin−Vout)/(Ri/L), that is, the slope compensation signal is given as:

$$\frac{dVslope}{dt} = \alpha \cdot (Vin - Vout) \cdot \left(\frac{Ri}{L}\right), \quad (5)$$

where α is a proportionality factor.

FIG. 1 illustrates an exemplary construction of a step-down valley current mode switching regulator 10. The construction of the switching regulator 10 is illustrative only and is not intended to be limiting. In other embodiments, the DC offset correction circuit can be incorporated in step-down valley current mode switching regulators constructed using other circuit configurations. For example, the comparator 36 can compare directly the current in the low-side power switch S2, such as the voltage drop across the NMOS transistor, with the current in a reference resistance or a reference MOSFET device to avoid the loss of speed due to the use of the current sense OTA 28.

Figure 2:
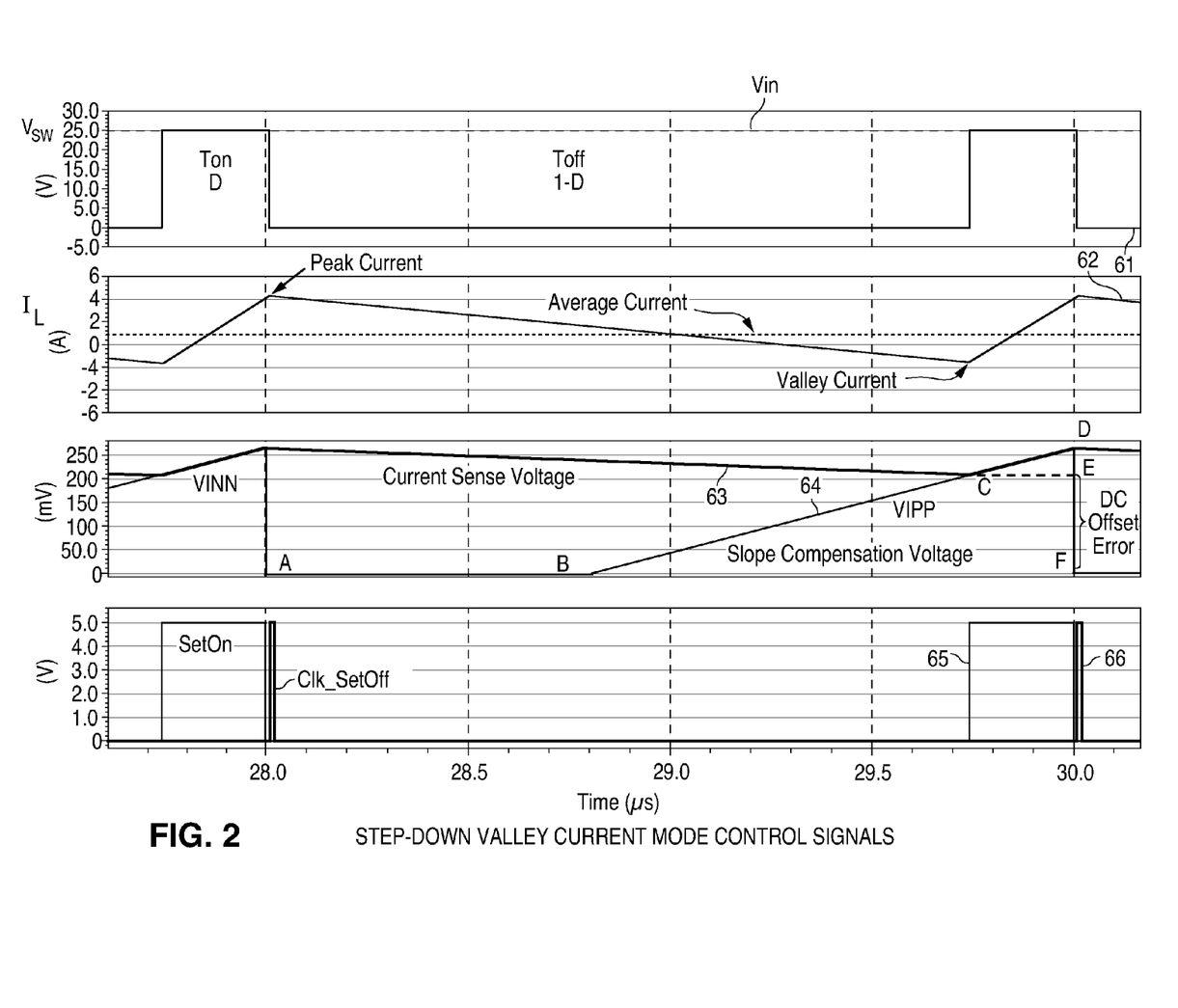
FIG. 2 illustrates the control signals for the operation of the valley current mode converter and also the DC offset added by the slope compensation signal and the DC offset correction introduced by the circuit and method of the present invention.

FIG. 2 illustrates the control signals for the operation of the valley current mode switching regulator of FIG. 1 in embodiments of the present invention. FIG. 2 illustrates the DC offset added by the slope compensation signal and the DC offset correction signal introduced by the DC offset correction circuit and method of the present invention. Referring to FIG. 2, a curve 61 depicts the voltage at the switching node LX between the two power switches, a curve 62 depicts the inductor current $I_L$, curves 63 and 64 depict the input voltages VINN and VIPP to the comparator 36, a curve 65 depicts the SetOn control signal and a curve 66 depicts the Clk_SetOff control signal for turning on or off the high-side power switch S1 (and correspondingly turning off or on the low-side power switch S2). The horizontal axis for all the curves is time in micro-seconds.

As shown in FIG. 2, the voltage $V_{SW}$ (curve 61) at the switching node LX of the inductor L1 switches between Vin (e.g. 25V) and ground (e.g. 0V). The inductor current $I_L$ (curve 62) varies between the peak current value and valley current value. The voltage VINN (curve 63) is the difference between the sensed current and the requested valley current generated by current loop OTA 26. The current difference is applied across resistor R6 to generate the voltage signal VINN, also referred to as the current sense voltage signal. The voltage VIPP (curve 64) is the slope compensation current signal Islope generated by the slope compensation circuit 35 and applied to resistor R5. The voltage VIPP is thus a voltage signal given as Islope*R5 and is referred to as the slope compensation voltage signal. The control signal Clk_SetOff (curve 66) from the timer oscillator 46 sets the high-side power switch S1 off and the low-side power switch S2 on. The control signal SetOn (curve 65) generated by the comparator 36 detects the valley current event and sets the high-side power switch S1 on and sets the low-side power switch S2 off.

In the present illustration, the slope compensation signal is applied from time B up to time D so that it satisfies the condition of being present for duty cycle D<50% in valley current mode. From time C to time D, the slope compensation voltage signal is summed on the opposite side of the current sense voltage signal so that equation (4) is respected because the two curves—current sense voltage signal and slope compensation voltage signal—have the same slew rate. FIG. 2 illustrates the particular case when α=1 in equation (5) so that the voltage segment DE can be considered equal to the peak-to-peak inductor current Ipp. Because equation (4) is respected, two similar triangles BDF and CDE result.

In FIG. 2, the DC offset error introduced by the slope compensation voltage signal is depicted by the voltage segment EF. Compared with the voltage segment DE which represents the reflected peak to peak current in the inductor, the DC offset error is 4-5 times greater in the present example. With the DC offset error being denoted by voltage segment EF, from triangle DBF and triangle DCE, the voltage segment EF can be expressed as:

$$\frac{EF}{DE} = \frac{BF - CE}{CE} \quad (6)$$

If the time period BF which is the time the slope compensation is applied and the time for the enable slope signal EnSlope is 60%*T (where T is the switching period), then the DC offset error can be expressed as:

$$\frac{EF}{Ipp} = 0.6 * \frac{1}{D} - 1 \quad (7)$$

In the present example, the value of 60%*T is illustrative only and not intended to be limiting. The value of 60%*T is chosen as a good practice to start stabilization of the current loop with adequate margin against the critical condition (D≤50%) of current loop instability, while minimizing the added amount of slope compensation signal that later would need to be compensated and corrected for. It is possible to extend the concept and derive equations for different percentages of the switching period T over which the slope compensation signal is added, including the full duty cycle.

For a 10% duty cycle (D=10%), a ratio between the DC offset error EF and the inductor peak-to-peak current Ipp of 5 results.

For the valley current mode buck switching regulator operating in continuous mode and negligible loss, Equation (7) becomes:

$$\frac{EF}{Ipp} = 0.6 * \frac{Vin}{Vout} - 1 \quad (8)$$

To generate the equations for the DC offset error for other types of switch regulators, such as boost, flyback, buck-boost or forward conduction mode, the duty cycle D in Equation (7) is replaced with the correct formula as the duty cycle is a function of the input voltage Vin and the output voltage Vout in continuous mode.

As shown in FIG. 2, the DC offset error can be very large compared with the inductor peak-to-peak current Ipp which is sized in the present example between 20% and 40% of the maximum load. Even if a fixed canceling correction is applied in a fixed operation point, the moment the input voltage Vin changes, the DC offset error will vary and will be reflected on the feedback node FB (node 20) and reflected through the voltage gain of error amplifier 22 onto the error amplifier output signal Comp (node 24), thereby reducing the line regulation.

Replacing the peak-to-peak current Ipp (T, L, Vin, Vout) for the continuous current mode buck switching regulator in Equations (7) and (8), the DC offset error—also referred to as "SlopeOffset"—can be given as:

$$SlopeOffset = EF = \frac{T}{L} * Vin * \left(0.6 - \frac{Vout}{Vin}\right) * \left(1 - \frac{Vout}{Vin}\right) \quad (9)$$

where T denotes the switching period and L denotes the inductance of the inductor L1.

The DC offset error (SlopeOffset) is a non-linear function of Vin and Vout. While a precise synthesis of the DC offset error quantity is possible with suitable techniques either in the analog or digital domain, in some embodiments of the present invention, in order to simplify the circuit implementation, a linear approximation of Equation 9 is used to approximate the DC offset error.

In embodiments of the present invention, the DC offset correction circuit 50 is incorporated in switching regulator 10 (FIG. 1) to provide a DC correction current signal to the summing node 30 where the DC correction current is a function of the input voltage and the output voltage. In particular, the DC correction circuit 50 implements an adaptive DC correction error matching and adaptive slope compensation. In the present embodiment, the DC correction current signal is provided to the negative input terminal of the comparator 36. The DC correction current signal cancels in a given operation point the DC offset error (SlopeOffset) introduced by the slope compensation signal. The DC correction current signal of the present invention provides a good canceling effect on a large range of input and output (Vin/Vout) voltages. In embodiments of the present invention, the DC offset correction circuit 50 generates a DC correction current signal that is a linear function of the input voltage Vin and output voltage Vout. In some embodiments, the DC offset correction circuit 50 generates the DC correction current signal ("SlopeDCCorrection") using a linear approximation to the DC offset error given in equation (9) and is given as:

$$SlopeDCCorrection = \frac{T}{L} * a(Vin - b * Vout) \text{ if } D <= 0.5 \quad (10)$$

$$SlopeDCCorrection = 0 \text{ if } D > 0.5$$

where a and b are constants.

Accordingly, the DC correction current signal is adaptive to the input voltage Vin and the output voltage Vout. In both Equations (9) and (10), the DC correction current signal is applied only for the switching period when slope compensation signal is applied and only for duty cycle values when the slope compensation signal is applied. If the proportionality factor α in Equation (5) is not 1 and the slew rate of the slope compensation signal is undersized or oversized, the linear function defined in Equation (10) can be used to approximately cancel the DC offset error.

Returning to FIG. 1, the input voltage Vin and the output voltage Vout are provided to the slope compensation circuit 35 to generate the slope compensation signal Islope. Meanwhile, the input voltage Vin and the output voltage Vout are also provided to the DC offset correction circuit 50 to generate the DC correction current signal Icorr, such as using Equation (10) above in an example embodiment of the present invention.

Figure 3:
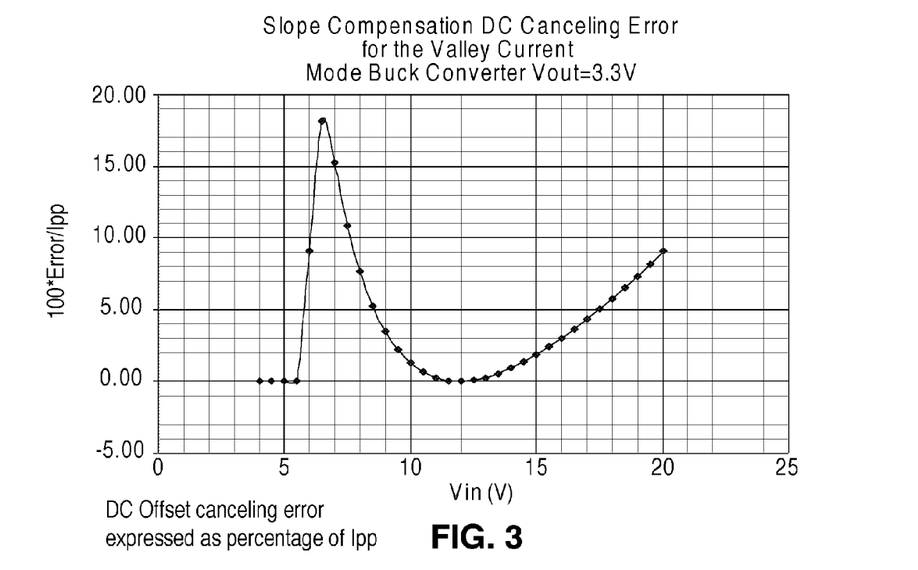
FIG. 3 illustrates the error in percent as a function of Vin for the DC canceling error in the valley current mode buck converter of FIG. 1.

FIG. 3 illustrates the error in percent as a function of input voltage Vin for the DC canceling error in the valley current mode buck switching regulator in some examples. In the present example, values of a=0.523, b=2 are used in Equation (10). Similar small canceling errors can be obtained for a fixed Vin and Vout over in a given range.

Figure 4:
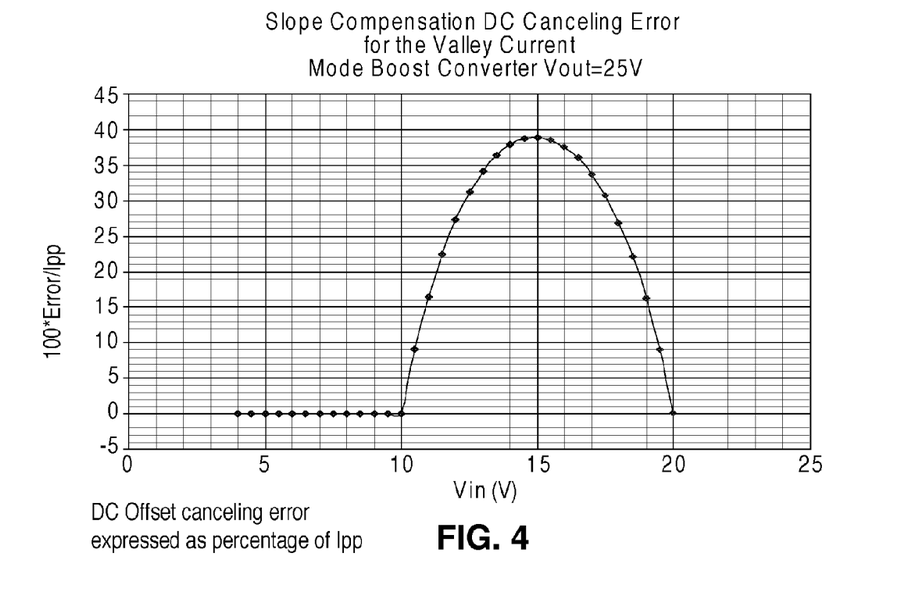
FIG. 4 illustrates the error in percent as a function of Vin of canceling the DC offset introduced by the slope compensation for a valley current mode boost converter.

FIG. 4 illustrates the error in percent as a function of Vin for the DC canceling error introduced by the slope compensation signal for a valley current mode boost switching regulator in some examples. The same DC offset error correction can be applied to a boost switching regulator to cancel the DC offset error due to slope compensation. Similar results can be obtained in continuous mode for buck-boost, forward and other control loops based on valley current mode.

Figure 5:
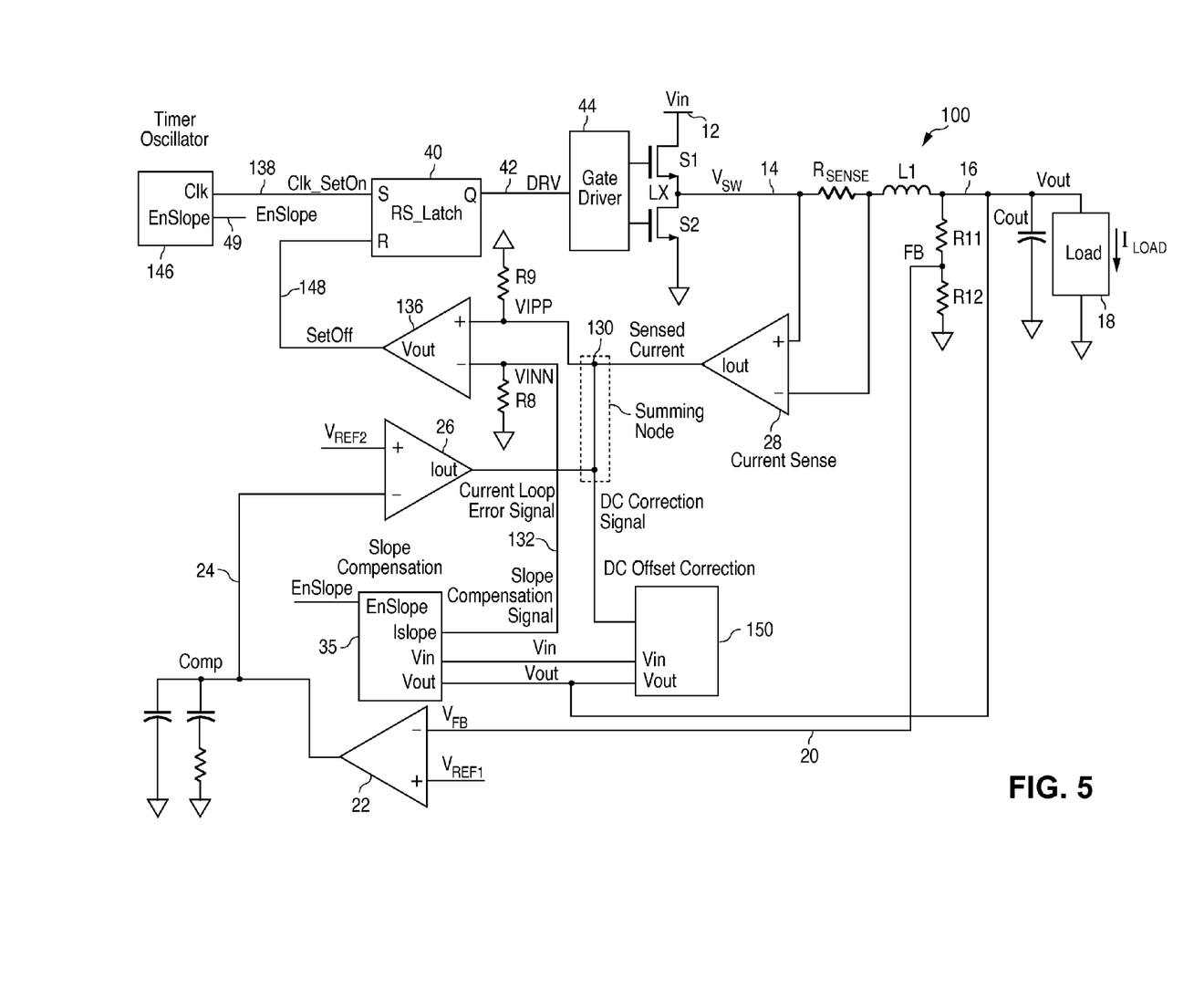
FIG. 5 illustrates a step-down peak current mode converter with slope compensation and DC offset correction according to one embodiment of the present invention.

FIG. 5 illustrates a step-down peak current mode switching regulator with slope compensation and DC offset correction according to one embodiment of the present invention. The switching regulator 100 of FIG. 5 is constructed in a similar manner as the switching regulator 10 of FIG. 1 and same elements are labeled with the same reference numerals and will not be further described. Referring to FIG. 5, switching regulator 100 includes a current mode feedback control circuit implementing peak current mode control. The feedback control circuit of switching regulator 100 includes a current control loop to assess the inductor current relative to a reference current value being the peak inductor current and to control the turning on or off of the power switches so as to deliver the required energy to the load. In particular, the current control loop senses the inductor current and the sensed current is compared to a current loop error signal to control the turning off of the high-side power switch S1. Meanwhile, the feedback control circuit further includes a voltage control loop to assess the switching regulator output voltage to control the turning on or off of the power switches so as to regulate the output voltage to the desired voltage value.

In embodiments of the present invention, the voltage control loop of the current mode feedback control circuit includes a feedback network, such as a voltage divider formed by resistors R11 and R12, to divide down the output voltage Vout to generate a feedback voltage $V_{FB}$ on a feedback node (FB) 20. The feedback voltage $V_{FB}$ is provided to an error amplifier 22 to be compared with the reference voltage $V_{REF1}$. The error amplifier output signal Comp (node 24) is indicative of the difference between the feedback voltage $V_{FB}$ and the reference voltage $V_{REF1}$. The Comp output signal is used to control the power switches S1 and S2 to turn on and off to regulate the output voltage Vout to be equal to a reference voltage $V_{REF1}$ or to a voltage value related to the reference voltage $V_{REF1}$.

In embodiments of the present invention, the current control loop of the current mode feedback control circuit includes a current loop operational transconductance amplifier (OTA) 26 configured to receive the error amplifier output signal Comp and a current control reference voltage $V_{REF2}$. The error amplifier output signal Comp is assessed relative to the current control reference voltage $V_{REF2}$ to generate an output current signal being the current loop error signal. The current loop error signal is indicative of a requested inductor current value being the inductor current value needed to maintain the output voltage Vout at the desired voltage level. In the present embodiment, OTA 26 is used to implement signal processing in the form of current signals and is not intended to limit the scope of the present invention. Signal processing could be performed using voltage signals only or using a mixture of voltage and current signals. In that case, OTA 26 may be omitted or may be replaced using other operational amplifier circuits.

The current control loop of the current mode feedback control circuit further includes a resistor Rsense coupled between the switching node 14 (LX) and the inductor L1 to act as the current sense resistor for sensing the inductor current. In other embodiments, other methods for current sensing can be used and the use of resistor Rsense is illustrative only and not intended to be limiting. For example, the current sensing can be performed using the high-side power switch S1, with the appropriate conditioning of the sensed current signal (for example, blanking) Current sensing can also be realized using the DCR (DC resistance) of the inductor L1 or using a sense resistance in series with the source terminal of the high-side power switch S1.

In the present embodiment, a current sense operational transconductance amplifier (OTA) 28 is coupled to sense the voltage across the resistor Rsense which is indicative of the current flowing through the inductor L1 and to generate a current output signal being the sensed current. The sensed current is summed with the current loop error signal at a current summing node 130. In the present description, currents being "summed" or combined at the current summing node can refer to the currents being added or subtracted. The use of the term "summing" is illustrative of the currents being combined but not necessarily related to the polarity of the current values.

In the present embodiment, the slope compensation signal (node 132) is added to the current control loop to enhance the stability of the current mode feedback control. In the present embodiment, the slope compensation signal is a current signal Islope generated by a slope compensation circuit 35 and is introduced to the current control loop through DC coupling. In the present embodiment, the slope compensation signal is a current signal Islope generated by a slope compensation circuit 35 and is introduced to the current control loop through DC coupling. The slope compensation signal is provided only over a certain range of duty cycles of the switching regulator as controlled by the signal enable slop EnSlope (node 49) generated by a timer oscillator 46, as will be described in more detail below. In the present embodiment, the slope compensation signal is generated as a function of the input voltage Vin and the output voltage Vout. Methods for generating the slope compensation signal is known in the art and will not be further described.

The current control loop, in response to the sensed current and the current loop error signal, generates a control signal SetOff (node 148). The control signal SetOff is asserted to turn off the high-side power switch S1 in response to the detection of the inductor current reaching a certain current limit. In the present embodiment, the control signal SetOff is asserted to turn off the high-side power switch S1 in response to the detection of the inductor current reaching a certain peak current limit in the peak current control mode.

In the present example, the control signal SetOff (node 148) is coupled to the Reset input terminal of the RS_Latch 40. When the SetOff control signal is asserted, the latch 40 deasserts the Q output terminal (node 42) which provides the drive signal DRV to the power switches. The drive signal DRV is provided to a gate driver circuit 44 to generate the gate drive signals to drive the gate terminals of the power switches S1 and S2. In response to the drive signal DRV being deasserted, the gate driver circuit 44 generates a gate drive signal to turn off the high-side power switch S1 and to turn on the low-side power switch S2. In this manner, the peak current control loop controls the turning off of the high-side power switch S1 when the inductor reaches a certain peak current limit. The turning off of the high-side power switch S1 in turns causes the switching voltage $V_{SW}$ to decrease which causes the inductor current $I_L$ to decrease.

In the present embodiment, the high-side power switch S1 is turned off for a given duration and then the high-side power switch S1 is turned on and the low-side power switch S2 is turned off until the peak current control loop detects that the inductor current has increased to the given peak current limit and initiates another cycle to decrease the inductor current.

In the present embodiment, a timer oscillator 146 generates a clock signal Clk_SetOn (node 138) which is coupled to the Set input terminal of the RS_Latch 40. When the Clk_SetOn signal is asserted, the latch 40 asserts the drive signal DRV (node 42) and the high-side power switch S1 is turned on while the low-side power switch S2 is turned off. The timer oscillator 146 also generates an enable slope signal EnSlope (node 49) which is provided to the slope compensation circuit 35 to trigger the generation of the slope compensation signal (node 132) at the specific point of the switching period determined by the timer oscillator.

As described above, while the use of a slope compensation signal improves the stability of operation, introducing the slope compensation signal through DC coupling results in a DC offset error at the output voltage Vout. In embodiments of the present invention, a DC offset correction circuit 150 is incorporated in the switching regulator 100 to counter the DC offset introduced by the slope compensation signal. The DC offset correction circuit 150 generates a DC correction current which is provided to the summing node 130 to be summed with the sensed current and the current loop error signal. The construction of the DC offset correction circuit will be described in more detail below.

In switching regulator 100, the current mode feedback control loop includes a comparator 136 configured to generate the control signal SetOff based at least on the sensed current and the current loop error signal. The SetOff control signal (node 148) is asserted to indicate that the high-side power switch S1 should be turned off. At comparator 136, the summing node 130 is coupled to the positive input terminal of the comparator while the slope compensation current signal is coupled to the negative input terminal of the comparator. In the present embodiment, comparator 136 is a voltage comparator and the summed current as well as the slope compensation current signal are converted to voltage signals by respective resistors R9 and R8 at the input terminals of the comparator.

More specifically, at the summing node 130, the current loop error signal, generated by the current loop OTA 26, is subtracted from the sensed current, generated by the current sense OTA 28, and the current difference is converted to a voltage VIPP by resistor R9. The voltage signal VIPP is applied to the positive input terminal of the comparator 136. Meanwhile, the slope compensation current signal (node 132) is generated by the slope compensation circuit 35 and is converted to a voltage VINN by resistor R8. The voltage signal VINN is coupled to the negative input terminal of the comparator 136. The comparator 136 generates the control signal SetOff to turn off the high-side power switch S1 in response to the detection of the inductor current reaching a certain peak current limit.

In some embodiments, at the input of the comparator 136, the common mode can be designed to be always greater than ground level by having a differential current output for the current loop OTA 26, the current sense OTA 28, the slope compensation circuit 35, and the DC offset correction circuit 150. The common mode currents multiplied with resistors R8 and R9 move the common mode of the comparator well in the positive range.

The current sense gain Ri for the peak current mode switching regulator 100 is the same as given in Equation (3) above. The optimum Vslope scaled at the summing node to match the inductor current slew rate seen through the current sense gain Ri is:

$$\frac{dVslope}{dt} = Vout * \left(\frac{Ri}{L}\right) \quad (11)$$

The Vslope signal is brought in the summing node 130 as the slope compensation signal Islope through dIslope/dt on resistor R8.

FIG. 5 illustrates an exemplary construction of a step-down peak current mode switching regulator 100. The construction of the switching regulator 10 is illustrative only and is not intended to be limiting. In other embodiments, the DC offset correction circuit can be incorporated in step-down peak current mode switching regulators constructed using other circuit configurations. For example, the comparator 136 can compare directly the current in the high-side power switch S1, such as the voltage drop across the NMOS transistor, with the current in a reference resistance or a reference MOSFET device to avoid the loss of speed due to the use of the current sense OTA 28.

Figure 6:
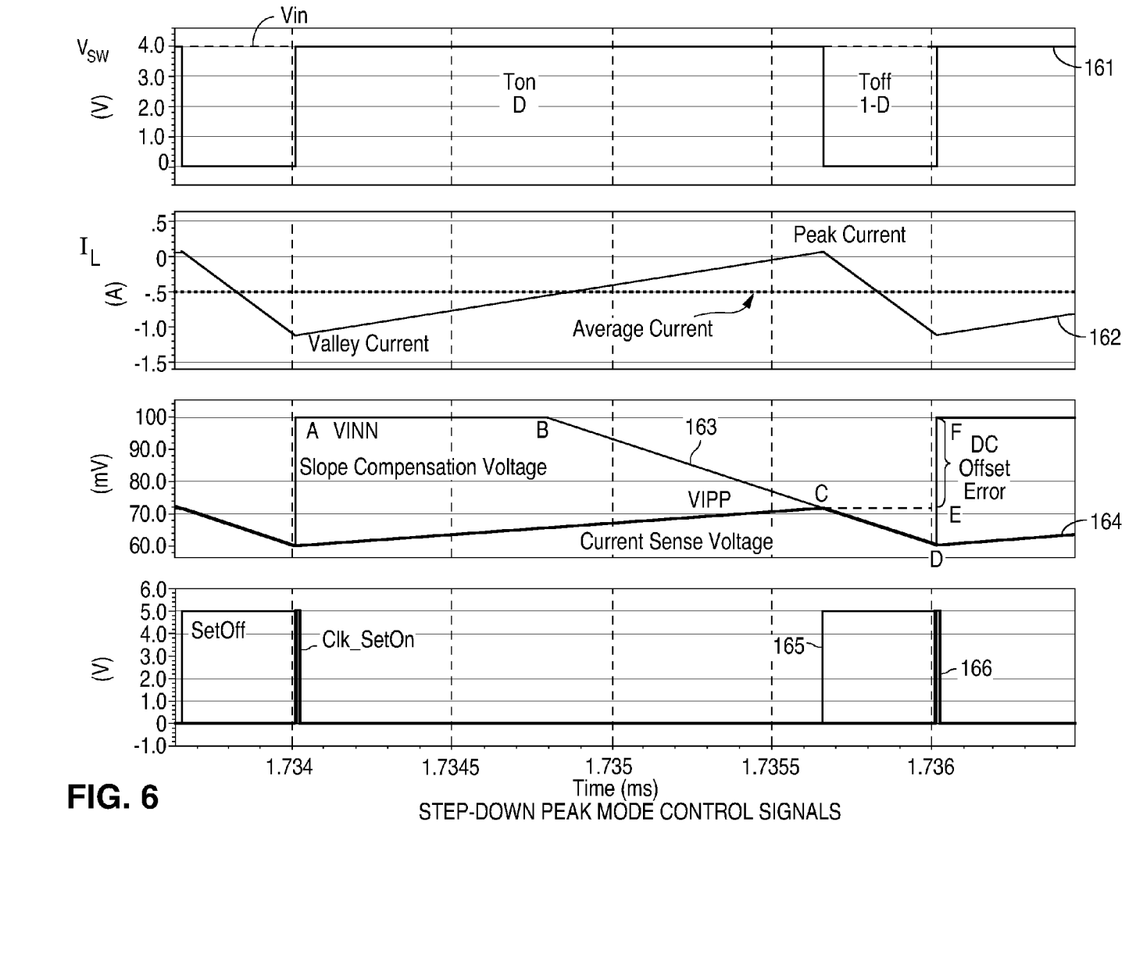
FIG. 6 illustrates the control signals for the operation of the peak current mode converter and also the DC offset added by the slope compensation signal and the DC offset correction introduced by the circuit and method of the present invention.

FIG. 6 illustrates the control signals for the operation of the peak current mode switching regulator of FIG. 5 in embodiments of the present invention. FIG. 6 illustrates the DC offset added by the slope compensation signal and the DC offset correction signal introduced by the DC offset correction circuit and method of the present invention. Referring to FIG. 6, a curve 161 depicts the voltage at the switching node LX between the two power switches, a curve 162 depicts the inductor current $I_L$, curves 163 and 164 depict the input voltages VINN and VIPP to the comparator 136, a curve 165 depicts the SetOff control signal and a curve 166 depicts the Clk_SetOn control signal for turning on or off the high-side power switch S1 (and correspondingly turning off or on the low-side power switch S2). The horizontal axis for all the curves is time in micro-seconds.

As shown in FIG. 6, the voltage (curve 161) at the switching node LX of the inductor L1 switches between Vin (e.g. 4V) and ground (e.g. 0V) with a duty cycle of 82.5% to generate an output voltage of 3.3V. The inductor current $I_L$ (curve 162) varies between the peak current value and valley current value. The voltage VIPP (curve 164) is the difference between the sensed current and the requested peak current generated by current loop OTA 26. The current difference is applied across resistor R9 to generate the voltage signal VIPP, also referred to as the current sense voltage signal. The voltage VINN (curve 163) is the slope compensation current signal Islope generated by the slope compensation circuit 135 and applied to resistor R8. The voltage VINN is thus a voltage signal given as Islope*R8 and is referred to as the slope compensation voltage signal. The control signal Clk_SetOn (curve 166) from the timer oscillator 146 sets the high-side power switch S1 on and the low-side power switch S2 off. The control signal SetOff (curve 165) generated by the comparator 136 detects the peak current event and sets the high-side power switch S1 off and sets the low-side power switch S2 on.

In the present illustration, the slope compensation signal is applied from time B up to time D so that it satisfies the condition of being present for duty cycle D>50% in peak current mode. From time C to time D, the slope compensation voltage signal is summed on the opposite side of the current sense voltage signal so that equation (11) is respected because the two curves (current sense voltage signal and slope compensation voltage signal) have the same slew rate for optimum slope compensation. Because equation (11) is respected, two similar triangles BDF and CDE result. Equation (11) is a particular case which allows a reference to the peak to peak inductor current to be represented in the voltage segment DE and a quantitative evaluation of the DC correction current needed. Equation (11) depicts the optimal point for the slope compensation and DC correction. The validity and generality of results is not invalidated by the fact that Equation (11) is a particular case.

In FIG. 6, the DC offset error introduced by the slope compensation voltage signal is depicted by the voltage segment EF. From the similarity of triangles BDF and CDE, the voltage segment EF, which represent the DC offset error, can be expressed as:

$$\frac{EF}{DE} = \frac{BF - CE}{CE} \quad (12)$$

If the time period BF which is the time the slope compensation is applied is 60%*T (where T is the switching period), then the DC offset error can be expressed as:

$$\frac{EF}{Ipp} = 0.6 * \frac{1}{1 - D} - 1 \quad (13)$$

In the present example, the value of 60%*T is illustrative and not intended to be limiting. The value of 60%*T is chosen as a good practice to start stabilization of the current loop with adequate margin against the critical condition (D≥50%) of current loop instability, while minimizing the added amount of slope compensation signal that later would need to be compensated and corrected for. It is possible to extend the concept and derive equations for different percentages of T over which the slope compensation signal is added, including the full duty cycle.

For a 90% duty cycle (D=90%), a ratio of the DC offset error EF and the inductor peak-to-peak current Ipp of 5 results which represent a large number and define the problem of the DC Offset (EF) that needs to be addressed by the DC offset correction circuit of the present invention.

For the peak current mode buck switching regulator in continuous mode, Equation (13) becomes:

$$\frac{EF}{Ipp} = 0.6 * \frac{Vin}{Vin - Vout} - 1 \quad (14)$$

To generate the equations for the DC offset error for other types of switching regulators, such as boost, flyback, buck-boost or forward conduction mode, the duty cycle D in equation (13) is replaced with the correct formula as the duty cycle is a function of the input voltage Vin and the output voltage Vout in continuous mode.

Replacing the peak-to-peak current Ipp (T, L, Vin, Vout) for the continuous current mode buck switching regulator in Equations (13) and (14), the DC offset error—also referred to as "SlopeOffset"—can be given as:

$$SlopeOffset = \quad (15)$$

$$EF = \frac{T}{L} * Vin * \left(\frac{Vout}{Vin} - 0.4\right) * \frac{Vout}{Vin} \text{ for } D = \frac{Vout}{Vin} > 40\%$$

$$SlopeOffset = 0 \text{ for } D = \frac{Vout}{Vin} < 40\%$$

where T denotes the switching period and L denotes the inductance of the inductor L1.

As shown in Equation (15), the DC offset error (SlopeOffset) is a non-linear function of Vin and Vout. While a nonlinear complex canceling of the DC offset error by a DC offset correction signal is possible, a linear approximation of the offset correction shown Equation (16) below can be used for easier implementation of the DC offset correction circuit 150.

In embodiments of the present invention, the DC offset correction circuit 150 is incorporated in the step-down peak current mode switching regulator 100 of FIG. 5 to provide a DC correction current signal to the summing node 130. More specifically, the DC correction current signal is provided to the positive input terminal of the comparator 136. The DC correction current signal cancels in a given operation point the DC offset error (SlopeOffset) introduced by the slope compensation signal. In embodiments of the present invention, the DC offset correction circuit 50 generates a DC correction current signal that is a linear function of the input voltage Vin and output voltage Vout. In some embodiments, the DC offset correction circuit 150 generates the DC correction current using a linear approximation to the DC offset error in Equation (15) and is given as:

$$SlopeDCCorrection = \frac{T}{L} * a(Vin - b * Vout) \text{ if } D >= 0.5 \quad (16)$$

$$SlopeDCCorrection = 0 \text{ if } D < 0.5$$

where a and b are constants.

Accordingly, the DC correction current signal is adaptive to the input voltage Vin and the output voltage Vout. In both Equations (15) and (16), the DC correction current signal is applied only for the switching period when slope compensation signal is applied and only for duty cycle values when the slope compensation signal is applied.

Returning to FIG. 5, the input voltage Vin and the output voltage Vout are provided to the slope compensation circuit 35 to generate the slope compensation signal Islope. Meanwhile, the input voltage Vin and the output voltage Vout are also provided to the DC offset correction circuit 150 to generate the DC correction current signal Icorr, such as using Equation (16) above in an example embodiment of the present invention.

Figure 7:
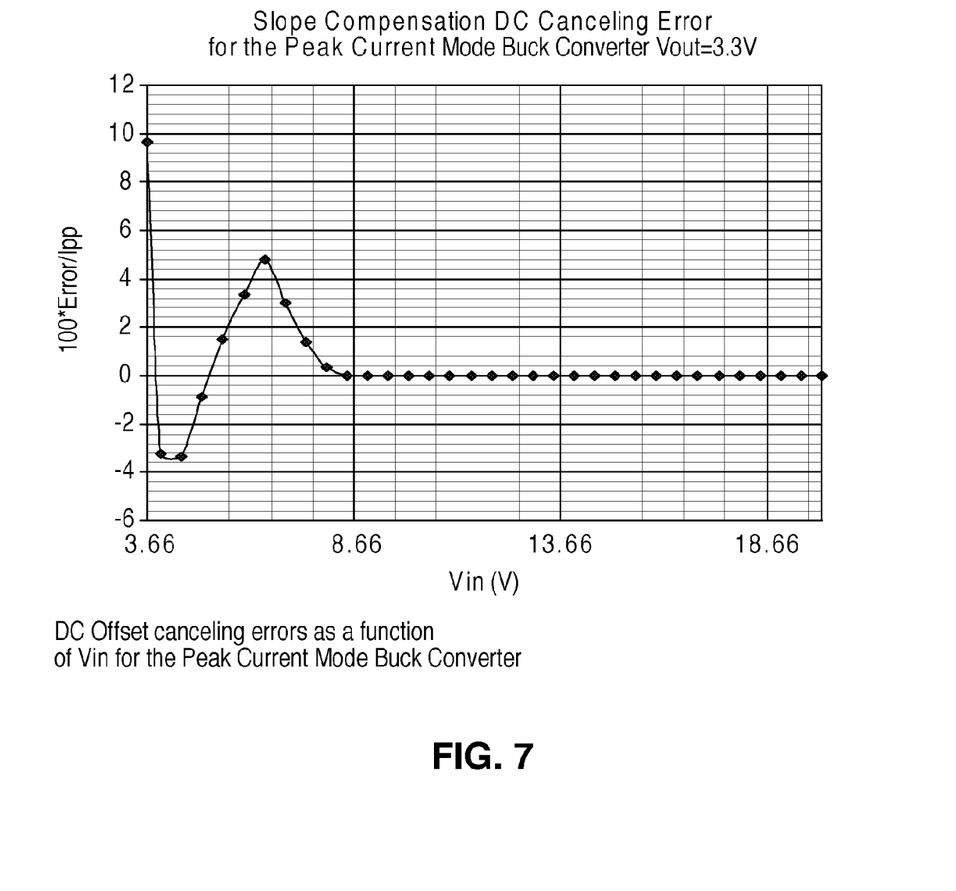
FIG. 7 illustrates the error in percent as a function of Vin for the DC canceling error in the peak current mode buck converter of FIG. 5.

FIG. 7 illustrates the error in percent as a function of Vin for the DC canceling error in the peak current mode buck switching regulator in some examples. In the present example, values of a=1.1, b=0.5 are used in Equation (16).

Figure 8:
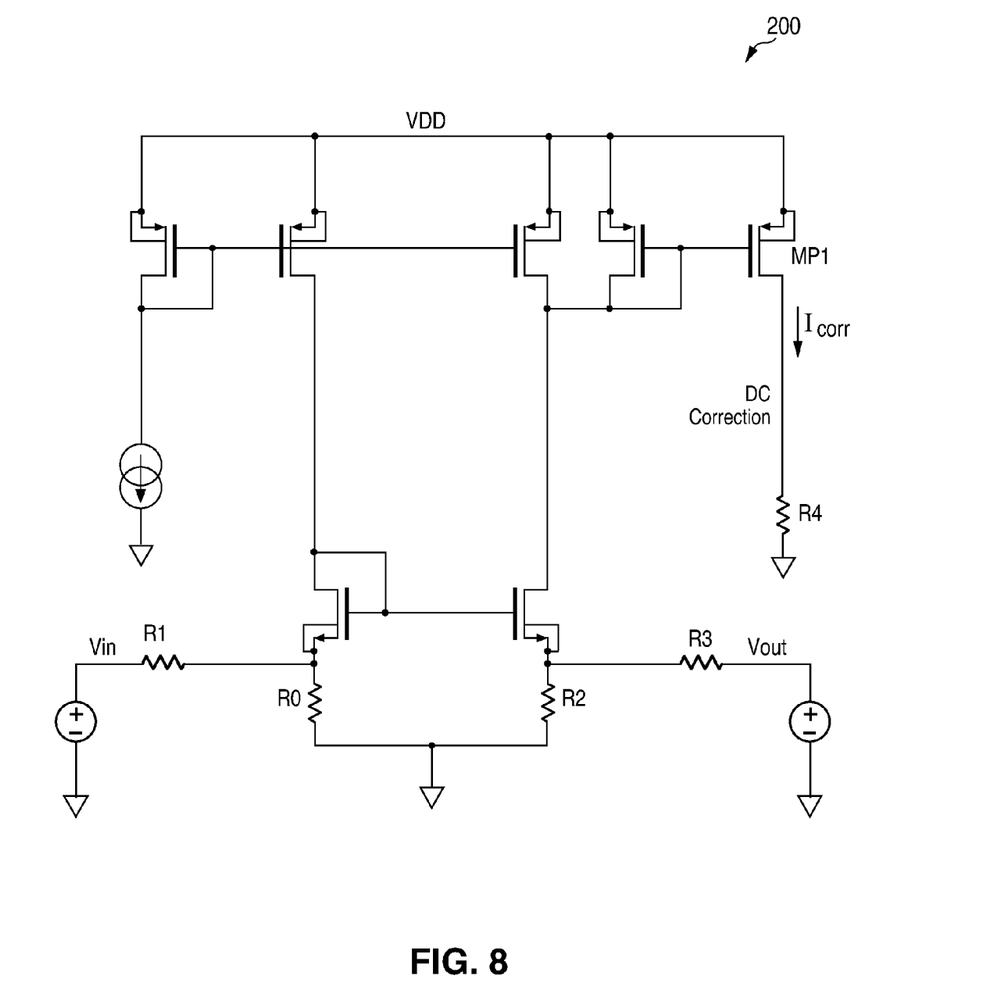
FIG. 8 is a circuit diagram illustrating one example of a DC offset correction circuit which be used to implement DC offset error correction due to slope compensation in embodiments of the present invention.

FIG. 8 is a circuit diagram illustrating an example of a DC offset correction circuit which be used to implement DC offset error correction due to slope compensation in embodiments of the present invention. In the example shown in FIG. 8, the DC offset correction using Equation (10) above is implemented. The DC offset correction circuit 200 receives the input voltage Vin and the output voltage Vout as input voltage signals. The input voltage Vin and the output voltage Vout are coupled to a differential pair. The output signal of the differential pair is coupled to a current mirror where a PMOS transistor MP1 is biased to generate the DC correction current Icorr. In the DC offset correction circuit 200, appropriate values for a and b in Equation (10) are selected by selecting resistance values for resistors R0 to R4. With the values for a and b in Equation (10) selected, a desired amount of DC correction current Icorr is generated to provide optimal DC offset error correction.

For instance, in the present example, the duty cycle at which the DC correction current is added is 50% or Vin>2Vout. Resistors R0 and R1 are selected to have resistance values to scale the input voltage Vin to 0.1 Vin while resistors R2 and R3 are selected to have resistance values to scale the output voltage Vout to 0.2Vout. In this manner, a 50% duty cycle is realized. Other duty cycle values may be implemented through selecting different resistance values for R0 to R3. Also, in the DC offset correction circuit 200 of FIG. 8, the value of "a" is given as: a=R4/(R2∥R3) and the value of "b" is given as: b=2*R4/(R2∥R3). Resistance values for resistors R0 to R4 are selected to satisfy Equation (10).

More specifically, the DC offset correction circuit 200 generates a DC correction voltage signal Vcorr given as:

$$Vcorr = \frac{R4}{R2\|R3}(Vin - 2Vout), \text{ if } Vin > 2Vout, \quad (17)$$

$$Vcorr = 0, \text{ if } Vin <= 2Vout.$$

In summary, in embodiments of the present invention, a step down (or buck) valley current mode switching regulator implements adaptive DC correction to cancel the offset introduced by using an adaptive slope compensation.

In some embodiments, a method for canceling the offset generated by the added slope compensation for valley current mode switching regulator is described where the cancellation is implemented using the non-linear relationship of Vin and Vout as shown in equation (9).

In some embodiments, a method for canceling the offset generated by the added slope compensation for valley current mode switching regulator is described where the cancellation is based on a linear relationship of Vin and Vout as shown in equation (10)

In some embodiments, a method for canceling the offset generated by the added slope compensation for peak current mode switching regulator is described where the cancellation is implemented using the non-linear relationship of Vin and Vout as shown in equation (15).

In some embodiments, a method for canceling the offset generated by the added slope compensation for peak current mode switching regulators is described where the cancellation is based on a linear relationship of Vin and Vout as shown in equation (16).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A switching regulator being configured to receiving an input voltage and to generate a regulated output voltage, the switching regulator controlling a high-side switch and a low-side switch based on a feedback control scheme to drive a switch output node for generating a switching output voltage, the switch output node being coupled to an LC filter to generate the regulated output voltage having a substantially constant magnitude on an output node, the switching regulator comprising:

a current mode feedback control circuit configured to generate a control signal to turn on or off the high-side switch and the low-side switch in response to a first signal indicative of the difference between a feedback voltage indicative of the output voltage and a first reference signal and in response to a second signal indicative of a sensed current of an inductor of the LC filter, the current mode feedback control circuit further configured to generate a current loop error signal based on the first signal and a second reference signal, the current loop error signal being indicative of a requested inductor current value as a function of the first signal;

a slope compensation circuit configured to provide a slope compensation signal as a function of the input voltage and the output voltage and for a given range of duty cycle values, the slope compensation signal being provided to the current mode feedback control circuit; and a DC offset correction circuit configured to generate a DC offset correction signal having a signal value being a function of the input voltage and the output voltage, the DC offset correction signal being provided to the current mode feedback control circuit to be added to a subtracted signal being the current loop error signal subtracted from the second signal, wherein the DC offset correction signal is applied in response to the slope compensation signal being applied and has a magnitude selected to cancel a DC offset error introduced by the slope compensation signal at the regulated output voltage.

2. The switching regulator of claim 1, wherein the current mode feedback control circuit comprises:

a voltage control loop comprising:
a feedback network configured to generate the feedback voltage indicative of the regulated output voltage;
an error amplifier configured to receive the feedback voltage and to generate an error amplifier output signal as the first signal indicative of the difference between the feedback voltage and the first reference signal; and a current control loop comprising:
a current loop operational transconductance amplifier (OTA) configured to receive the error amplifier output signal and a second reference signal and to generate a current loop error signal having a magnitude indicative the difference between the error amplifier output signal and the second reference signal, the current loop error signal being indicative of the inductor current value requested by the voltage control loop;
a current sense circuit configured to generate the second signal indicative of the sensed current of the inductor of the LC filter; and
a comparator having a first input terminal configured to receive a first input signal indicative of a summed current value of the current loop error signal, the second signal indicative of the sensed current and the DC offset correction signal, and a second input terminal configured to receive the slope compensation signal, the comparator generating a comparator output signal, the comparator output signal being used to generate the control signal to turn on or off the high-side switch and the low-side switch.

3. The switching regulator of claim 1, wherein the switching regulator comprises a buck switching regulator and the current mode feedback control circuit comprises a valley current mode control feedback control circuit, the current mode feedback control circuit is configured to generate the control signal to turn on the high-side switch in response to the inductor current reaching a valley current limit.

4. The switching regulator of claim 1, wherein switching regulator comprises a buck switching regulator and the current mode feedback control circuit comprises a peak current mode control feedback control circuit, the current mode feedback control circuit is configured to generate the control signal to turn off the high-side switch in response to the inductor current reaching a peak current limit.

5. The switching regulator of claim 2, wherein the first input signal to the comparator comprises the current loop error signal subtracted from the second signal and the DC offset correction signal being added to the subtracted signal.

6. The switching regulator of claim 3, wherein the DC offset correction circuit is configured to generate the DC offset correction signal as a non-linear function of the input voltage, the output voltage.

7. The switching regulator of claim 3, wherein the DC offset correction circuit is configured to generate the DC offset correction signal as a linear function of the input voltage, the output voltage.

8. The switching regulator of claim 4, wherein the DC offset correction circuit is configured to generate the DC offset correction signal as a non-linear function of the input voltage, the output voltage.

9. The switching regulator of claim 4, wherein the DC offset correction circuit is configured to generate the DC offset correction signal as a linear function of the input voltage, the output voltage.

10. The switching regulator of claim 7, wherein the DC offset correction circuit is configured to generate the DC offset correction signal having a value $T/L*a(Vin-b*Vout)$ for duty cycle values less than 50%, where T denotes the switching period, L denotes the inductance of the inductor, and a and b denote constant values.

11. The switching regulator of claim 9, wherein the DC offset correction circuit is configured to generate the DC offset correction signal having a value $T/L*a(Vout-b*Vin)$ for duty cycle values greater than 50%, where T denotes the switching period, L denotes the inductance of the inductor, and a and b denote constant values.

12. A method in switching regulator receiving an input voltage and controlling a high-side switch and a low-side switch using a feedback control scheme to drive a switch output node for generating a switching output voltage, the switch output node being coupled to an LC filter circuit to generate a regulated output voltage having a substantially constant magnitude on an output node, the method comprising:

generating a feedback signal indicative of the regulated output voltage using a feedback network;
generating a first signal indicative of the difference between the feedback voltage and a first reference signal
generating a current loop error signal indicative of the difference between the first signal and a current reference signal;
generating a second signal indicative of a current in an inductor of the LC filter;
generating a slope compensation signal as a function of the input voltage and the output voltage and for a given range of duty cycle values;

generating a DC offset correction signal having a value being a function of the input voltage and the output voltage;

generating a third signal as a sum of the current loop error signal, the second signal and the DC offset correction signal, the current loop error signal being subtracted from the second signal, the DC offset correction signal being applied in response to the slope compensation signal being applied; and generating a control signal to turn on or off the high-side switch and the low-side switch in response to the third signal and the slope compensation signal.

13. The method of claim 12, wherein the switching regulator comprises a buck switching regulator and generating a control signal to turn on or off the high-side switch and the low-side switch comprises:

generating the control signal to turn on or off the high-side switch and the low-side switch in response to the inductor current reaching a valley current limit.

14. The method of claim 12, wherein the switching regulator comprises a buck switching regulator and generating a control signal to turn on or off the high-side switch and the low-side switch comprises:

generating the control signal to turn on or off the high-side switch and the low-side switch in response to the inductor current reaching a peak current limit.

15. The method of claim 14, wherein generating a DC offset correction signal having a value being a function of the input voltage and the output voltage comprises:

generating the DC offset correction signal as a linear function of the input voltage and the output voltage and having a value T/L*a(Vout−b*Vin) for duty cycle values greater than 50%, where T denotes the switching period, L denotes the inductance of the inductor, and a and b denote constant values.

16. The method of claim 13, wherein generating a DC offset correction signal having a value being a function of the input voltage and the output voltage comprises:

generating the DC offset correction signal as a linear function of the input voltage and the output voltage and having a value T/L*a(Vin−b*Vout) for duty cycle values less than 50%, where T denotes the switching period, L denotes the inductance of the inductor, and a and b denote constant values.

17. A switching regulator being configured to receiving an input voltage and to generate a regulated output voltage, the switching regulator controlling a high-side switch and a low-side switch based on a feedback control scheme to drive a switch output node for generating a switching output voltage, the switch output node being coupled to an LC filter to generate the regulated output voltage having a substantially constant magnitude on an output node, the switching regulator comprising:

a current mode feedback control circuit configured to generate a control signal to turn on or off the high-side switch and the low-side switch in response to a first signal indicative of the difference between a feedback signal indicative of the regulated output voltage and a first reference signal and in response to a second signal indicative of a sensed current of an inductor of the LC filter;

a slope compensation circuit configured to provide a slope compensation signal as a function of the input voltage and the output voltage and for a given range of duty cycle values, the slope compensation signal being provided to the current mode feedback control circuit; and a DC offset correction circuit configured to generate a DC offset correction signal having a signal value being a function of the input voltage and the output voltage, the DC offset correction signal being provided to the current mode feedback control circuit, wherein the DC offset correction signal is applied in response to the slope compensation signal being applied and has a magnitude selected to cancel a DC offset error introduced by the slope compensation signal at the regulated output voltage; and wherein the current mode feedback control circuit comprises:

a voltage control loop comprising:

a feedback network configured to generate the feedback signal indicative of the regulated output voltage;

an error amplifier configured to receive the feedback signal and to generate an error amplifier output signal as the first signal indicative of the difference between the feedback signal and the first reference signal; and a current control loop comprising:

a current loop operational transconductance amplifier (OTA) configured to receive the error amplifier output signal and a second reference signal and to generate a current loop error signal having a magnitude indicative the difference between the error amplifier output signal and the second reference signal, the current loop error signal being indicative of the inductor current value requested by the voltage control loop;

a current sense circuit configured to generate the second signal indicative of the sensed current of the inductor of the LC filter; and a comparator having a first input terminal configured to receive a first input signal indicative of a summed current value of the current loop error signal, the second signal indicative of the sensed current and the DC offset correction signal, and a second input terminal configured to receive the slope compensation signal, the comparator generating a comparator output signal, the comparator output signal being used to generate the control signal to turn on or off the high-side switch and the low-side switch.

18. The switching regulator of claim 17, wherein the first input signal to the comparator comprises the current loop error signal subtracted from the second signal and the DC offset correction signal being added to the subtracted signal.

* * * * *